Nov. 23, 1965 L. R. WILLIAMS 3,219,972
AUTOMOBILE PARKING POSITION INDICATOR
Filed Sept. 6, 1961 2 Sheets-Sheet 1
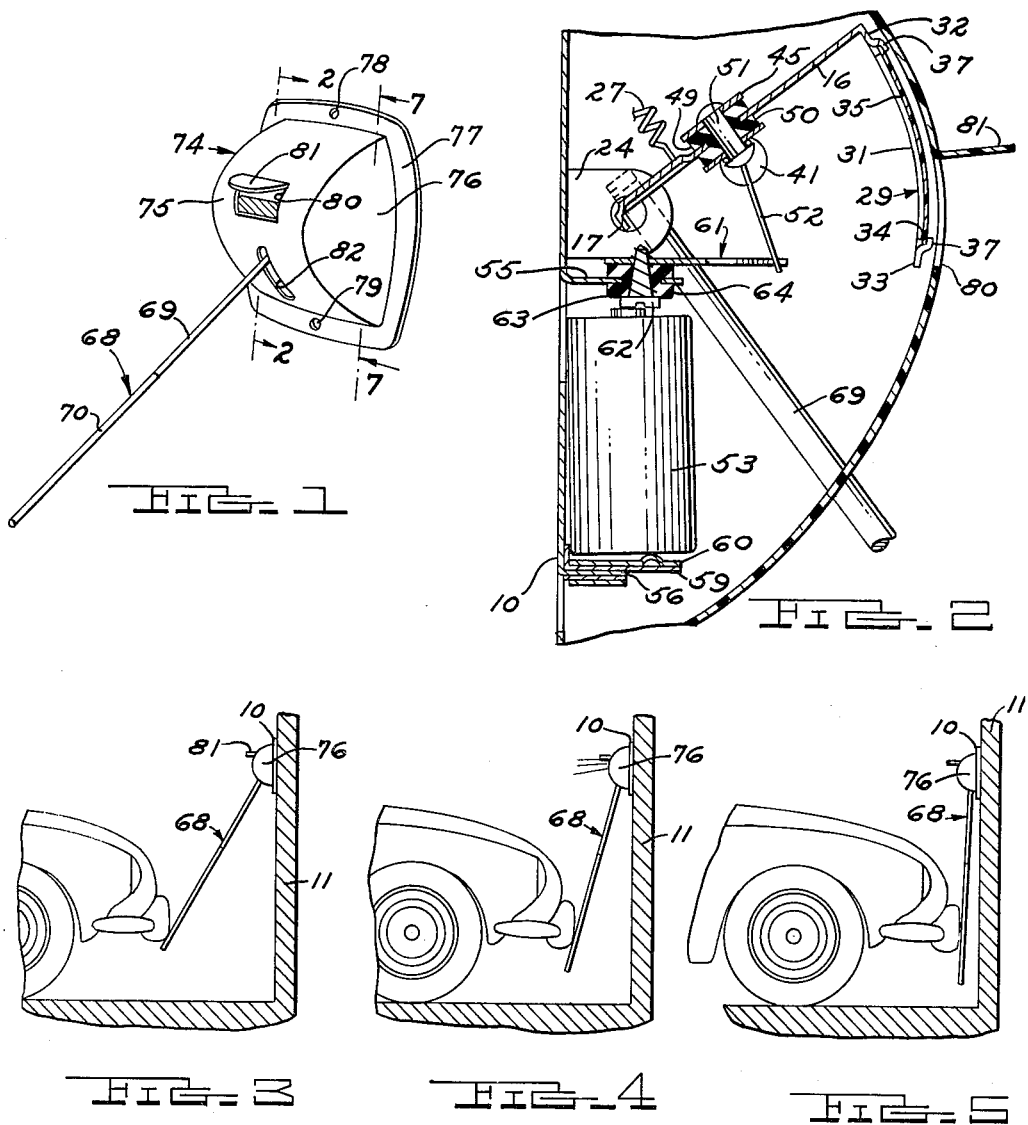
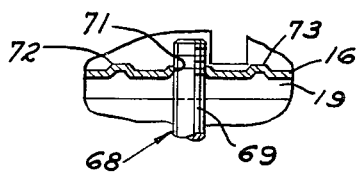
INVENTOR.
LYNDON R. WILLIAMS
BY
Donnelly, Mentag & Harrington
ATTORNEYS

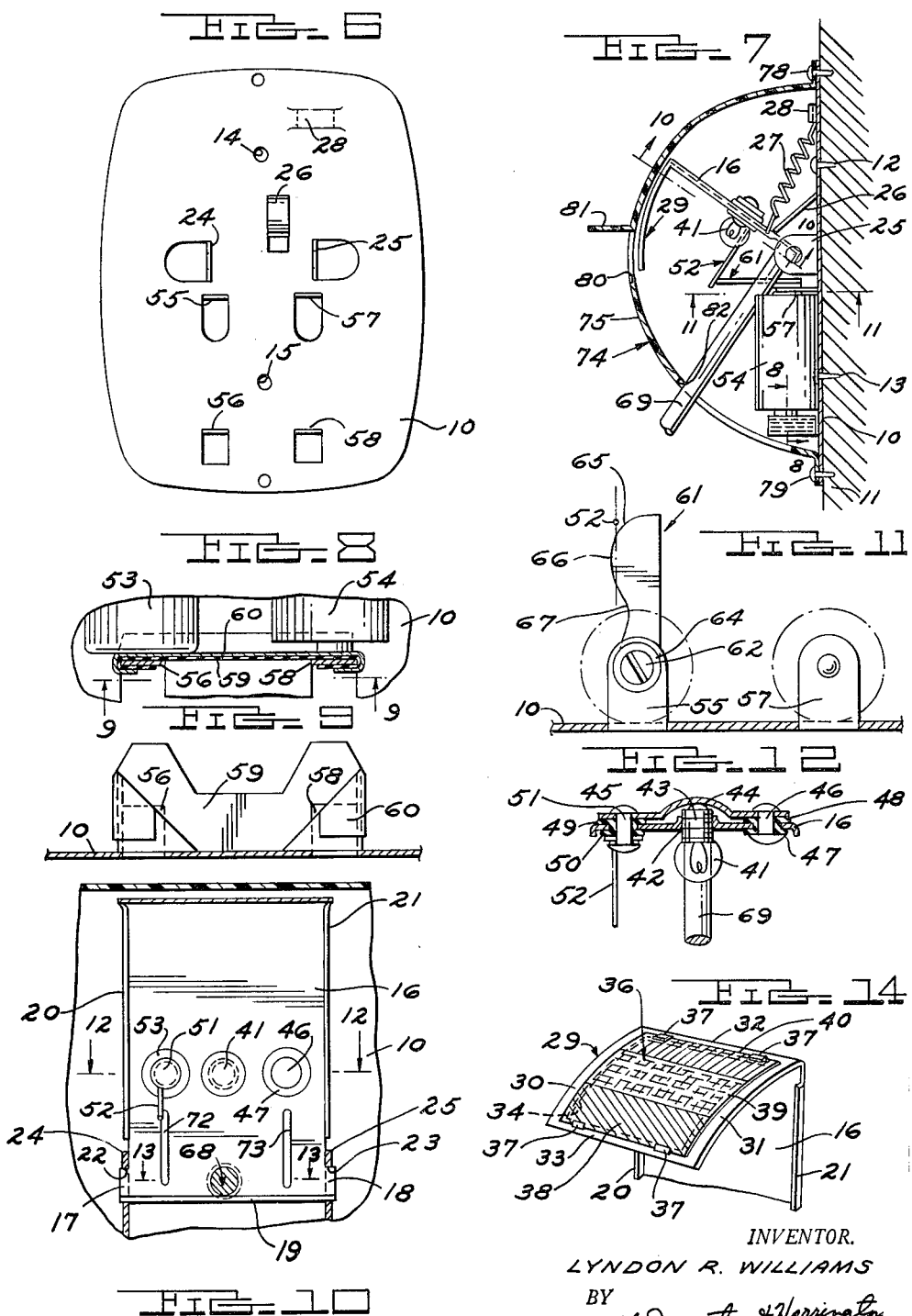

United States Patent Office 3,219,972
Patented Nov. 23, 1965

3,219,972
AUTOMOBILE PARKING POSITION INDICATOR
Lyndon R. Williams, 806 Magnolia, Royal Oak, Mich.
Filed Sept. 6, 1961, Ser. No. 136,314
4 Claims. (Cl. 340—61)

This invention relates generally to improvements in parking position indicators and more particuarly to an automobile parking position indicator which is adapted to signal a driver of an automobile so as to indicate the movement of his automobile toward a stationary object such as the end wall of a garage so that he may stop the automobile before it strikes the garage wall and causes damage thereto or to the automobile.

The positioning of an automobile in a garage requires considerable accuracy in stopping the automobile in the required position so as to avoid damage to the wall or the bumper of the vehicle and also to insure that the bumper at the other end of the vehicle will not project outwardly of the garage so as to be in the path of the movement of the garage door. Accordingly, it is the primary object of the present invention to provide an automobile parking position indicator for indicating to the automobile driver the exact position of his vehicle in the garage and provide a position indicator for indicating when the automobile is in the desired position within the garage so that the bumper will not contact the garage wall nor will the opposite end bumper lie in the path of movement of the garage door.

It is another object of the present invention to provide an automobile parking position indicator that is operated by contact with the automobile bumper whereby the indicator shows the exact position of the automobile in such a manner so as to be readily seen by the automobile operator at any time under any condition.

Other objects, features and advantages of this invention will be apparent from the following detailed description, appended claims, and accompanying drawings.

In the drawings:

FIG. 1 is a perspective view of an automobile parking position indicator made in accordance with the principles of the invention;

FIG. 2 is an enlarged, fragmentary, elevational section view of the structure illustrated in FIG. 1, taken along the line 2—2 thereof, and looking in the direction of the arrows;

FIG. 3 is a side elevation of the parking position indicator of FIG. 1, showing it in a mounted operative position, with an automobile at an initial indicator engaging position;

FIG. 4 is a view similar to FIG. 3, showing the automobile actuating the signal;

FIG. 5 is a view similar to FIG. 3, showing the automobile stopped in its final position;

FIG. 6 is a front elevation view of back wall plate, showing the mounting brackets struck from this plate for supporting the batteries and the pivoted signal means;

FIG. 7 is an enlarged, fragmentary, elevational section view of the structure illustrated in FIG. 1, taken along the line 7—7 thereof, and looking in the direction of the arrows;

FIG. 8 is an enlarged, fragmentary, elevational section view of the structure illustrated in FIG. 7, taken along the line 8—8 thereof, and looking in the direction of the arrows;

FIG. 9 is a fragmentary bottom plan view of the structure illustrated in FIG. 8, with the batteries removed, and looking in the direction of the arrows;

FIG. 10 is an enlarged, fragmentary elevational view of the structure illustrated in FIG. 7, taken along the line 10—10 thereof, and looking in the direction of the arrows;

FIG. 11 is an enlarged, fragmentary bottom plan view of the structure illustrated in FIG. 7, taken along the line 11—11 thereof, and looking in the direction of the arrows;

FIG. 12 is a fragmentary section view of the structure illustrated in FIG. 10, taken along the line 12—12 thereof, and looking in the direction of the arrows;

FIG. 13 is an enlarged, fragmentary section view of the structure illustrated in FIG. 10, taken along the line 13—13 thereof, and looking in the direction of the arrows; and FIG. 14 is a fragmentary perspective view of a modified pivoted signal means employed in the invention.

Referring now to the drawings, and in particular to FIGS. 3, 8 and 9, the numeral 10 indicates the vertical back plate or supporting plate which is adapted to be fixedly secured to the wall 11 of a garage by any suitable means as by the screws 12 and 13 which are adapted to pass through the holes 14 and 15, respectively. The mounting plate 10 is made from any suitable conductive material as for example, steel.

The apparatus of the present invention is provided with a swingably mounted indicating means which includes the pivotally mounted metal plate 16, as shown in FIGS. 2, 7 and 10. The plate 16 is substantially rectangular in overall shape and is provided on the lower end thereof with a pair of outwardly extended pivot arms 17 and 18. The swinging plate 16 is further provided with the flange 19 along the lower front edge thereof and the side edges are provided with a crimp as indicated by the numerals 20 and 21 for strength purposes. The swinging plate 16 is preferably stamped from a single piece of metal. As shown in FIGS. 6, 7 and 10, the pivot arms 17 and 18 are pivotally mounted in the holes 22 and 23 which are formed in the mounting brackets 24 and 25, respectively. The mounting brackets 24 and 25 are struck forwardly from the metal mounting plate 10 as clearly shown in FIGS. 6 and 7.

As shown in FIGS. 6 and 7, a stop member 26 is struck outwardly and forwardly from the mounting plate 10 and the swinging plate 16 is held against the outer end of the stop member 26 by means of the return spring 27. The return spring 27 has one end thereof suitably connected to the swinging plate 16 and the other end thereof is adapted to be hooked around the outwardly extended strip of metal 28 which is struck from the plate 10 outwardly in the forward direction.

As shown in FIGS. 2, 7 and 14, the swinging plate 16 is provided with an arcuately shaped tongue on the outer end thereof and generally indicated by the numeral 29. The arcuate tongue 29 is provided with the side rails 30 and 31 and the integral top and bottom rails 32 and 33, respectively. The rail members 30, 31, 32 and 33 form a frame surrounding an opening indicated by the numeral 34. The opening 34 is adapted to be covered either by a piece of suitable transparent material indicated by the numeral 35 in FIG. 2, or by a piece of material indicated by the material 36 in FIG. 14 and which is provided with a plurality of different colors. The opening covering elements 35 and 36 are secured in place on the arcuate indicator tongue 29 by any suitable means as by the clip members 37 which are struck from the top and bottom rails 32 and 33 and as shown in FIGS. 2 and 14.

The transparent indicator member 35 may be formed from any suitable material as for example, from a piece of transparent plastic material. The indicator material 36 may be formed with a plurality of colored lines thereon as for example, the colored lines 38, 39 and 40 which indicate the colors green, yellow and red, respectively. These colors may be placed on the member 36 by any suitable means as for example, they may be put on the member 36 with a fluorescent material. The covering 35 may also be made with any plain color but the plastic material should be of the type which will pass light rays.

As shown in FIGS. 2, 7, 10 and 12, the swinging plate 16 is provided with an indicator light means or bulb designated by the numeral 41. The bulb 41 may be of any conventional type as for example, the type bulb used in a conventional flashlight. As shown in FIG. 12, the bulb 41 is adapted to be threadably mounted in the hole 42 which is struck through the swinging plate 16 at a central position and at a point a little below the horizontal center line of the plate 16. The one terminal 43 of the bulb 41 is less obviously in electrical contact with the plate 16. The other terminal 44 of the bulb is adapted to make electrical contact with the strap 45 which is carried on the back side of the swinging plate 16.

As shown in FIG. 12, one end of the strap 45 is secured to the swinging plate 16 by means of the rivet 46 which is insulated from the plate 16 by means of the two insulating washers 47 and 48. The other end of the conductor strap 45 is also insulated from the swinging plate 16 in a similar manner and by means of the insulating washers 49 and 50. The rivet 51 secures said other end of the strap 45 to the plate 16, but the rivet is not in electrical contact with the plate 16 in the same manner as the rivet 46 is not in electrical contact with the plate 16. The rivet 51 is, however, in electrical contact with the strap 45 and with the feeler contact or feeler wire of the switching means and the feeler wire is indicated by the numeral 52. As shown in FIGS. 10 and 12, the switch feeler contact wire 52 has the upper end thereof looped around the rivet 51 and it abuts against the metallic conductive washer 53 so as to provide good conductive contact with the rivet 51.

The bulb 41 is adapted to be energized at the proper time by means of the following described switch means and battery means. As shown in FIGS. 2, 6, 7, 8 and 12, a pair of batteries 53 and 54 are operatively held in place on the mounting plate 10 by means of the mounting brackets 55, 56, 57 and 58. The battery mounting brackets are struck outwardly forwardly from the plate 10. The batteries 53 and 54 are any conventional flashlight batteries. The lower end of the batteries 53 and 54 are electrically connected in series as shown in FIGS. 8 and 10. The battery mounting brackets 56 and 58 are interconnected by the piece of insulating material as 59 which is mounted across the tops of the battery mounting brackets 56 and 58 and folded thereunder so as to insulate the mounting brackets from the batteries 53 and 54. In order to electrically connect the lower ends of the batteries 53 and 54, a conductive piece of material as 60 is laid over the insulating material 59 and folded thereunder and the outer edge is shaped to the same configuration as the insulating material 59. The conductive material 60 may be any conductive flexible sheet material.

As shown in FIG. 7, the upper end of the one battery 54 is directly engageable with the metallic mounting bracket 57 whereby the upper end of this battery is in electrical contact with the mounting plate 10. The upper end of the other battery 53 is not in electrical contact with the mounting plate 10 but is adapted to be in contact with an adjustably mounted stationary switch contact indicated by the numeral 61, as shown in FIGS. 2, 7 and 11. As shown in FIG. 2, the upper end of the battery 52 is in electrical contact with the stationary switch contact 61 by means of the screw 62 which is threadably mounted into the inner end of the contact plate 61 and which passes through the hole 63 formed in the bracket 55. The screw 62 is insulated from the bracket 55 by means of the insulated washer 64 which extends through the hole 63 and extends above and below the bracket 55. The switch feeler contact 52 is adapted to engage the curved edge portions of the stationary switch contact 61 along the curved point 65, 66 and 67 for energizing and deenergizing the bulb 41 when the plate 16 is swung downwardly from the position shown in FIG. 7, as more fully described hereinafter.

As shown in FIGS. 1, 2, 10 and 13, the indicator is provided with an operating lever or rod generally indicated by the numeral 68. The rod 68 is preferably made tubular in shape and from any suitable material as from aluminum or the like. The rod 68 may be made in any number of portions or detachable parts as for example, it is illustrated as being made from the detachably connected portions 69 and 70 which may joined together by any suitable means as by being threadably engageable with each other. As shown in FIGS. 10 and 13, the inner end 69 of the operating rod is threadably mounted in the hole 71 which is struck from the swinging plate 16. As shown in FIGS. 10 and 13, the plate 16 may be provided with longitudinal strength as by having the two outwardly extended longitudinal projections 72 and 73 pressed outwardly therefrom.

The automobile parking position indicator of the present invention further includes a housing or cover generally indicated by the numeral 74 which includes the outwardly extended body having the concave face 75 and the vertical sidewardly tapering sidewalls 76. The housing 74 further includes the peripheral flange 77 which is adapted to seat against the plate 10 and to be releasably secured thereto by means of the mounting screws 78 and 79.

As shown in FIGS. 1, 2 and 7, the housing 74 is provided with an opening 80 which is formed through the front convex wall 75 and through which is seen the indicator tongue 29. The opening 80 may be provided with an outwardly extended flange 81 along the upper edge thereof as shown in FIGS. 1 and 7. The flange 81 may be formed from the material in the wall 75 by striking the flange outwardly and upwardly to the position shown in FIG. 7 to form the opening 80.

The operation of the position indicator apparatus of the present invention will be described by reference to FIGS. 1, 2, 3, 4, 5 and 7. The position indicator would be operatively mounted on the garage wall 11 in any suitable position as for example, in alignment with the center line of the automobile engine hood. When the device is in the inoperative position, the operating rod 68 will be in the position shown in FIG. 3 and the indicating tongue 29 will be in the position shown in FIGS. 2 and 7. In the inoperative device, the feeler contact 52 of the switch means is in the position substantially as shown in FIG. 11 whereby it is spaced apart from the end curved portion 65 so that the bulb 41 will not light. As the automobile is moved inwardly toward the garage wall 11, it engages the rod 68 and pivots the plate 16 so as to move it downwardly against the return action of the spring 27. The downward pivoting movement of the plate 16 in the counter clockwise direction as viewed in FIG. 7 will move the switch feeler contact 52 into engagement with the curved edge 66 of the stationary switch contact 61. The engagement of the switch feeler contact 52 with the stationary contact 61 completes a momentary circuit through the bulb 41 and the batteries 53 and 54 so as to energize the bulb 41 and the operator of the automobile will see the light of the energized bulb 41 through the opening 80. The energizing of the bulb 41 warns the driver that he is approaching a stop position whereby his automobile will be positioned in a proper distance from the wall 11 without engaging the same. Further movement from the position shown in FIG. 4 wherein is shown the light rays emerging from the opening 80 will move the rod 68 to the position shown in FIG. 5 whereby the bulb 41 will be energized. As the automobile moves from the position shown in FIG. 4 to that of FIG. 5, the feeler contact 52 will be moved from the curved contact portion 66 to the inwardly concave area 67 whereby the contact 52 will be spaced apart from the stationary contact 61 and the bulb 41 will not be energized. When the bulb 41 is deenergized by the fact that the feeler contact 52 is moved opposite to the concave portion 67 of the contact 61, the driver is warned that he is in the proper position to stop his car and he will accordingly take such action. It will be seen that when the automobile is in the position shown in FIG. 5, the bulb 41 will be deenergized and the device will not use any energy while the car is in a parked position in the garage. As shown in FIG. 1, the operating rod 68 is adapted to extend outwardly and downwardly through the opening 82 in the housing front wall 75.

The circuit through the batteries and the bulb 41 for energizing the same when the feeler contact 52 engages the curved contact portion 66, is completed in the following described manner. Starting with the top end of the battery 53 it will be seen that this end of the battery makes electrical contact with the screw 62 which is in turn in electrical contact with the stationary switch contact 61. When the plate 16 is moved so as to engage the feeler contact 52 at the curved portion 66, the feeler contact 52 is then in electrical contact with the fixed contact 61. The circuit is then completed back to the bottom end of the battery 53 in the following manner. The upper end of the feeler contact 52 is electrically connected to the rivet 51 which is connected to the strap 45 which is in turn in engagement with the bulb terminal 44. One end of the bulb filament is connected in the usual manner with the terminal 44 and the other end is connected with the bulb terminal 43. The bulb terminal 43 is threadedly engageable with the swinging plate 16 and the plate 16 is in metallic contact with the mounting plate 10 by means of the mounting ears or arms 17 and 18. The circuit is then completed through the battery mounting bracket 57 into the upper end of the battery 54 and thence through the lower end of the battery 54 to the crossover connector plate 60 to the lower end of the battery 53. It will be seen that the position of the stationary contact 61 may be adjusted about the axis of the mounting screw 62 so as to move the curved portions 66 into and out of the path of the movable feeler contact 52 to increase or decrease the length of lighting time of the bulb 41.

When the member 35 is used in the indicator tongue 29, the operator will either see the white light of the bulb 41 if transparent white plastic is used, or the operator will see the colored light sent through the transparent plastic 35 in accordance with the color thereof as for example, red, green and etc. If the three-color indicator tongue 36 is used, then it will be seen that when the plate 16 is in the inoperative position, the lower color green or 38 will be seen and when the automobile approaches the position shown in FIG. 4, the middle color 39 or the orange color will come into view, and when the automobile approaches the stop position of FIG. 5, the red color 40 will come into view. Experience has shown that the position indicator device is a very economical, practical and efficient parking device.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A parking indicating assembly for use on a surface disposed in the path of travel of a vehicle being parked, comprising, a mounting plate including means thereon for mounting the plate on a support surface, a housing removably mounted on and overlying said mounting plate, said housing including an opening in opposed relation to said mounting plate and a slot portion, an indicator plate pivotally mounted on said mounting plate on an axis of rotation spaced from said housing opening, an elongated operating rod mounted on said indicator plate and projecting angularly and outwardly from said mounting plate through the slot in said housing for engagement by a vehicle being parked, and displaceable toward said mounting plate, biasing means connected between said mounting and indicator plates normally urging said operating rod outwardly and angularly from said mounting plate, said indicator plate including a portion projecting radially from the axis of rotation thereof and including a terminal tongue disposed at one side of said housing opening and adjacent the inner surface of said housing, said tongue including a light-permeable portion alignable with said housing opening for traversing said opening when said indicator plate is rotated about its axis of rotation due to movement of said operating rod moving toward said mounting plate, an electrical circuit in said housing including a fixed contact plate projecting from said mounting plate toward said housing and disposed in spaced relation from said indicator plate, said indicator plate being connected in series in said circuit and having an electrically-energized bulb element mounted thereon with one contact of said bulb in series with said indicator plate, said bulb including a second terminal connected with a second contact extending from said indicator plate, normally in spaced relation from said fixed contact and movable with said indicator plate through a path of travel intersecting said fixed contact for closing the circuit to said bulb.

2. The structure as set forth in claim 1 in which said second contact plate comprises a wire element and said fixed contact has an edge portion engageable by said wire element.

3. The structure as set forth in claim 2 in which said edge portion includes an intermediate indented portion offset laterally from the path of travel of said wire element whereby the circuit to said bulb is broken after the contacts are engaged.

4. The structure as set forth in claim 2 in which said fixed contact includes means for adjusting the edge thereof laterally with respect to the path of travel of said wire element whereby the interval of opening and closing the circuit can be controlled.

References Cited by the Examiner

UNITED STATES PATENTS

| | | | |
|---|---|---|---|
| 2,445,953 | 7/1948 | Lancaster | 340—282 |
| 2,454,896 | 11/1948 | Traub | 340—61 |
| 2,731,934 | 1/1956 | Hausmann et al. | 340—61 |
| 2,834,002 | 5/1958 | Nordsiek | 340—61 |
| 2,988,738 | 6/1961 | Baker | 340—381 |

FOREIGN PATENTS 322,914    12/1929    Great Britain.

NEIL C. READ, *Primary Examiner.*

BENNETT G. MILLER, *Examiner.*